Inventor:
RUDOLF WITTENBECHER
BY:
H. Edward Wesleter

Inventor:
RUDOLF WITTENBECHER
BY:
H. Edward Mesleru

United States Patent Office 3,541,251
Patented Nov. 17, 1970

3,541,251

IMPLOSION-PROTECTING FRAME FOR TELEVISION PICTURE TUBES AND PROCESS FOR ITS INSTALLATION

Rudolf Wittenbecher, Berlin, Germany, assignor to Standard Elektrik Lorenz Aktiengesellschaft, a corporation of Germany Filed Feb. 27, 1968, Ser. No. 708,541
Claims priority, application Germany, Sept. 19, 1967, 1,639,050
Int. Cl. H01j 29/28, 61/50
U.S. Cl. 178—7.82 6 Claims

ABSTRACT OF THE DISCLOSURE

A band frame protecting television picture tubes upon implosion which consists of a part closely hugging the bulb of the tube and a shoulder having parallel walls with the first part which protrudes at given spacing beyond the frit seam present in each such tube. The frame can be mounted from the picture side of the tube and hence is particularly suited for installation on color tubes. It closely hugs the picture tube and provides magnetic shielding.

The invention relates to an implosion-protecting frame for television picture tubes and to a process of applying the frame to these tubes. The frame is applicable to color tubes as well as black and white.

It is an object of the invention to provide a process according to which the implosion-protecting frame is readily and rapidly mounted on the tube thus to be jacketed. The frame thereby surrounds the tube in a particularly tight manner with good tension.

Such a frame serves the purpose of protecting the front part of the picture tube, i.e., the part facing the viewer, from shattering in case of implosion, and furthermore to fasten the tube to the chassis of the television receiver by means of suitable clips, straps, or the like.

It is another object of the invention to provide a novel implosion-protecting frame which is particularly suited for jacketing of a color television picture tube which can be mounted according to the invention and thereafter tightly hugs the tube.

Conventional implosion-protecting frames are made from metal strips bent into frame shape whose cross section has a plurality of arches or curvatures, so that the frame fits the jacketing area of the tube as closely as possible. Frames of this kind not only are expensive to manufacture, but the fit is not accurate enough to surround the tube without play. Therefore, a slit is left between the tube and the frame which is several millimeters wide and is filled in with a sealing compound, usually of a synthetic resin, e.g., a urea-formaldehyde or similar resin. Obviously, this is a makeshift measure which is involved, time-consuming and expensive.

A process had previously been proposed to jacket picture tubes with a band frame disposed about the tube cross section whereby the frame has a slightly conical shape corresponding to that of the bulb leading to the picture screen, and is pressed against that bulb in the direction of the screen. Whereas this process appears to be a simplification of the jacketing technique, difficulties are encountered because the band frame must be pushed from the rear of the tube over the always present weld of the tube. In the case of color picture tubes, this process cannot be used because the frit seam is likely to be damaged.

It is another object of the invention to provide a process for the installation of a band frame on color picture tubes as well as on black and white tubes of any shape.

This is accomplished by mounting the band frame on the bulb from the screen side, whereby the opening of the frame corresponds in shape to the tube cross section within the area of the rounded zone between screen and jacketing area of the bulb of the tube. This eliminates the need of urging the frame over the weld, and the tensile stresses in final position can exactly be defined.

Under the influence of the pressure exerted on installation, the band-shaped, closed implosion-protecting frame extends and its circumference is enlarged by, e.g., 10 to 20 mm.

It is another object of the invention to shape a band frame in such a manner that it can be mounted on color picture tubes by means of the novel process proposed and fulfills its function more safely than heretofore.

It is more difficult to mount a band frame on color tubes than on black and white tubes because the former are not finished in the glass works to such an extent that the funnel in the rear of the bulb is joined with the dish containing the picture wall. The so-called masking frame first must be installed in the dish by the manufacturer of the electrical components before dish and funnel can be joined by a frit process. The seam thereby produced between dish and funnel must not be affected by the forces of reaction, exerting a deformation, during mounting of the band frame. On the other hand, it is desirable that the frame covers the frit seam and also the adjoining part of the glass bulb, away from the picture wall, in order to assure magnetic shielding of the picture tube.

It is still another object of the invention to provide an implosion-protecting frame which can be urged on the glass bulb of a television picture tube in such a manner that it lies thereagainst with such a tension which assures protection against implosion while the frit seam remains free from mechanical stresses generated by the mounting process.

For this purpose, the frame according to the invention has a portion of parallel walls coming to rest, upon installation, directly on the jacket of the glass bulb adjoining the picture wall, and further a shoulder pointing outwardly which extends substantially in parallel to the longitudinal axis of the bulb beyond the frit seam at a given spacing. The frame thus is shaped in steps and is mounted on the tube from the front, i.e., from the picture wall of the dish. Thereby, only the portion of the frame having a smaller cross section is subjected to deformation during mounting. This portion, after mounting, covers almost the entire jacketing area of the dish while the stepwise enlarged part engages over the frit seam and the end of the dish, respectively, with a given spacing. The shoulder between the two frame parts offers a good working surface for the die of the press on installation.

Further objects and embodiments of the invention will become apparent from the accompanying drawings and their description. However, it should be understood that these are given merely by way of illustration, and not of limitation, and that it is intended to cover all modifications and variations which do not constitute a departure from the spirit and the scope of the invention as hereinafter claimed.

Figure 1:
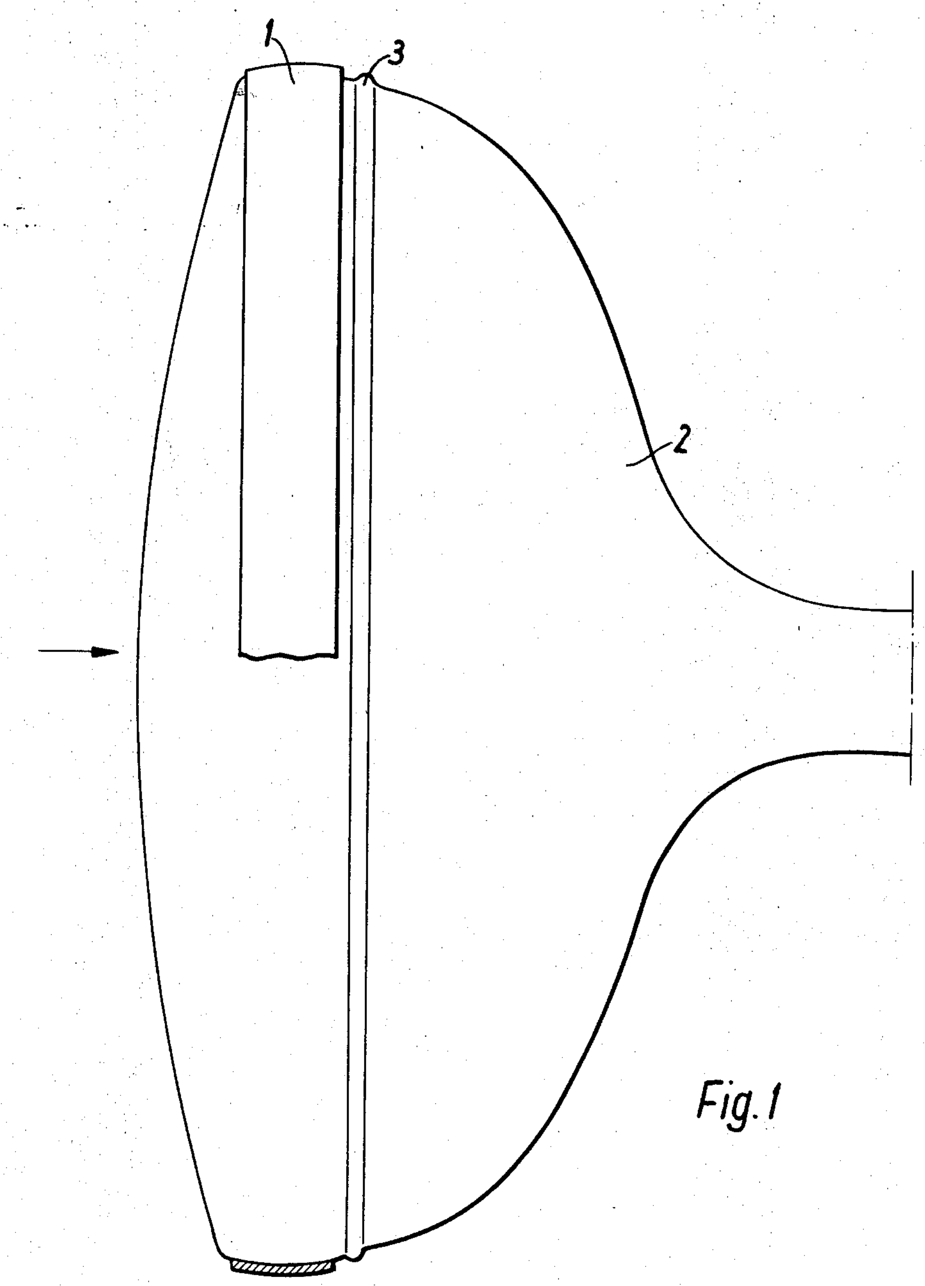
FIG. 1 is a side elevation of a conventional black and white television picture tube provided with implosion-protective frame according to the invention, shown partially in section.

Referring now to these drawings, according to FIG. 1, band frame 1, shown partly in section, is urged onto the glass bulb 2 in the direction of the arrow. For the protection against implosion, as desired, it sufficies to shape frame 1 so wide and to urge it against bulb 2 to such an extent that the largest part of the jacketing area between screen and weld 3 is covered.

Figures 2, 5:
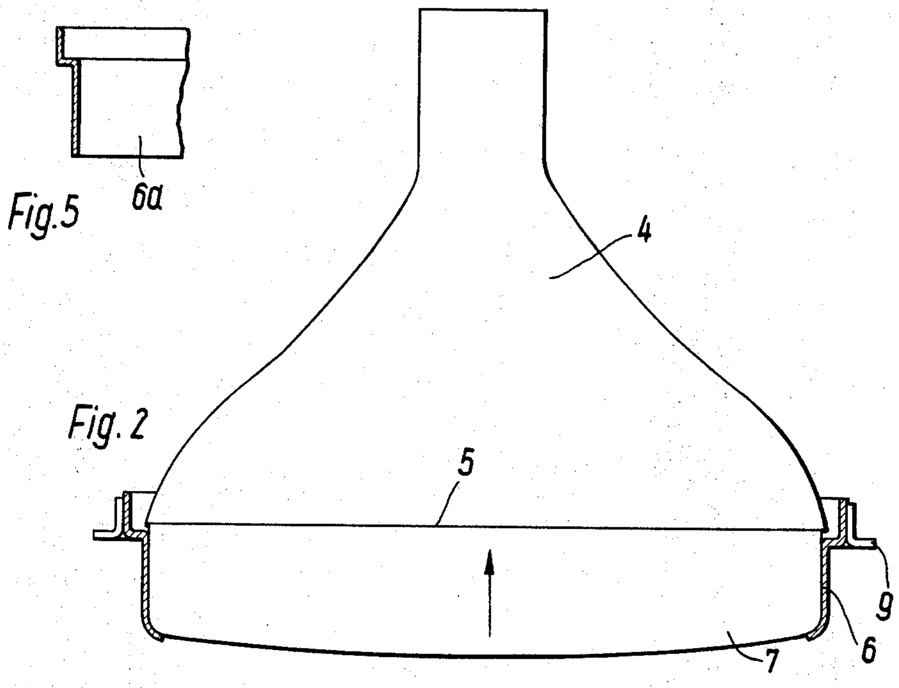
FIG. 2 is a front elevation of a color picture tube with implosion-protecting frame, shown in section.
FIG. 5 is an exploded view of a further embodiment of the frame.

As shown in FIG. 2, bulb 4 of a color picture tube has a frit seam 5 which extends across the total circumference of the jacket. The implosion-protecting frame 6 is shaped in steps and pressed upon the portion of bulb 4 which is in front of the frit seam 5, from the direction of wall 7, as indicated by the arrow. Shoulder 8 of the frame 6 serves as working surface for the press die (not shown) during installation.

Figure 3:
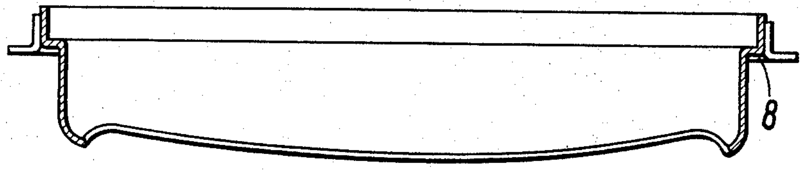
FIG. 3 is a longitudinal section through a frame.

FIG. 3 illustrates that that section of frame 6 which, after mounting, immediately adjoins picture wall 7 of bulb 4, is slightly arched to the inside all around, so that it closely hugs the outer zone of picture wall 7 and serves as shield therefor.

According to the special embodiment illustrated in FIG. 5, this section of frame **6*a*, may remain unchanged and even, so that the picture wall 7** is fully exposed.

Fastening means 9, such as latches, straps or loops, opportunely are disposed on the part of frame 6 which is extended stepwise in its inside cross section, and the finished color tube is connected to the chassis thereby after installation. The picture tube provided with frame 6 according to the invention thus has particularly small installation dimensions, and its mounting thereby is greatly facilitated.

The space remaining between the portion of frame 6 protruding beyond frit seam 5 and glass bulb 4 may be filled in with an insulating compound, if so desired. The magnetic shielding action of this portion also remains fully intact under these conditions. Filling of the free space has the additional advantage of imbedding and thus protecting the frit seam which is sensitive to mechanical action. This differs from the aforementioned compulsory sealing of small slits, as practiced in the prior art.

Figure 4:
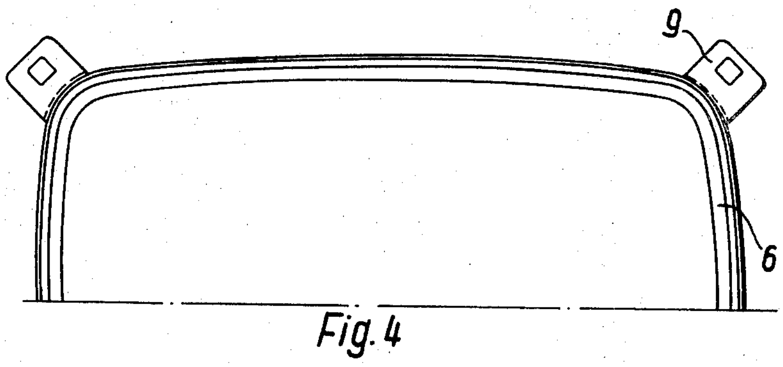
FIG. 4 is a front view of the upper half of a frame according to the invention.

As shown in FIG. 4, the fastening means 9 opportunely are disposed in the area of curving of the sidewalls of glass bulb 4.

The implosion-protective frame 6 offers the advantage, hitherto unattained, that it is mounted from the front of a color television picture tube and yet protrudes far beyond frit seam 5 while having magnetic shielding action.

It even is feasible to install frame 6 at the glass works, i.e., prior to fritting. The fritting step, connecting the dish with the funnel-shaped part of glass bulb 4, is not inhibited by the protruding portion of the frame.

I claim as my invention:

1. An implosion-protecting band frame for a television tube having a front picture wall, a jacket surrounding said wall, a glass bulb adjoining said wall, and a frit seam connecting portions of said bulb, said frame comprising a first portion closely hugging said jacket and an adjoining, outward-pointing shoulder protruding beyond said frit seam, substantially parallel to the longitudinal axis of said bulb and spaced from said bulb by an outwardly extending portion of said frame, said frame contacting said jacket up to said outwardly extending portion.

2. The band frame as defined in claim 1, wherein the portion of said frame facing said picture wall is arched inwardly, thus closely hugging said picture wall.

3. The band frame as defined in claim 1, wherein fastening means are disposed on said shoulder, for connecting said tube with the chassis of the television set.

4. The band frame as defined in claim 3, wherein said fastening means are latches disposed in the curved parts of the shoulder.

5. A process for mounting an implosion-protecting band frame on a television picture tube having a front picture wall, a jacket surrounding said wall, a glass bulb adjoining said wall, and a frit seam connecting portions of said bulb; said frame having a first part closely hugging said jacket after installation and an outward-pointing shoulder which extends beyond said frit seam after installation; said process comprising forcibly slightly extending the opening of said first part and then inserting the frame on said jacket from the front of said picture tube; and lining up said shoulder to extend beyond said seam in parallel and at a given equal spacing.

6. The process as defined in claim 5, further comprising filling in the space between said shoulder protruding beyond said frit seam and said glass bulb with an insulating compound.

References Cited

UNITED STATES PATENTS

| | | | |
|---|---|---|---|
| 2,827,584 | 3/1958 | Olson. | |
| 3,310,194 | 3/1967 | Bradu | 178—7.82 |
| 3,422,220 | 1/1969 | Bathelt | 178—7.82 |
| 3,412,203 | 11/1968 | D'Angelo. | |

RICHARD MURRAY, Primary Examiner

H. W. BRITTON, Assistant Examiner

U.S. Cl. X.R.

220—2.1